(12) United States Patent
Eljarat et al.

(10) Patent No.: US 10,564,276 B2
(45) Date of Patent: Feb. 18, 2020

(54) ADAPTIVE PROCESS NOISE DESCRIPTION FOR IMPROVED KALMAN FILTER TARGET TRACKING

(71) Applicant: GM Global Technology Operations LLC, Detroit, MI (US)

(72) Inventors: Ishai Eljarat, Jerusalem (IL); Igal Bilik, Rehovot (IL); Shahar Villeval, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 393 days.

(21) Appl. No.: 15/447,376

(22) Filed: Mar. 2, 2017

(65) Prior Publication Data
US 2018/0252804 A1    Sep. 6, 2018

(51) Int. Cl.
| | | |
|---|---|---|
| *G01S 13/72* | (2006.01) | |
| *G01S 13/93* | (2006.01) | |
| *G01S 13/66* | (2006.01) | |
| *G01S 7/40* | (2006.01) | |
| *G01S 13/931* | (2020.01) | |

(52) U.S. Cl.
CPC .......... *G01S 13/723* (2013.01); *G01S 13/931* (2013.01); *G01S 13/66* (2013.01); *G01S 13/726* (2013.01); *G01S 2007/403* (2013.01)

(58) Field of Classification Search
CPC ...... G01S 13/723; G01S 13/931; G01S 13/42; G01S 7/2955; G01S 17/936; G01S 2013/9321; G01S 13/726; G01S 7/414; G01S 13/72; G01S 13/66; F41G 7/006; G01C 21/165; B64G 3/00; H03H 17/0255; G06T 7/277; B60W 2050/0077; G06K 2209/21

See application file for complete search history.

(56) References Cited

U.S. PATENT DOCUMENTS

| | | | | |
|---|---|---|---|---|
| 5,051,751 A | * | 9/1991 | Gray | G01S 13/723 342/107 |
| 5,633,642 A | * | 5/1997 | Hoss | B60K 31/0008 342/70 |
| 5,819,206 A | * | 10/1998 | Horton | G06F 3/011 702/150 |
| 9,207,314 B1 | * | 12/2015 | Mookerjee | G01S 13/726 |
| 2004/0027274 A1 | * | 2/2004 | Driessen | G01S 7/2923 342/91 |
| 2005/0110661 A1 | * | 5/2005 | Yannone | G01O 23/00 340/945 |

(Continued)

*Primary Examiner* — Olumide Ajibade Akonai
(74) *Attorney, Agent, or Firm* — Cantor Colburn LLP

(57) ABSTRACT

A system and method to perform target tracking with a radar system that uses a Kalman filter include predicting a predicted target position of a target detected by the radar system in a frame. The frame is a period of time to transmit from every transmit element of the radar system in turn and receive the reflections from a range of the target. The method also includes determining an actual target position of the target detected by the radar system based on reflections received by the radar system for the frame, and computing a process noise covariance matrix Q for a next frame, immediately following the frame, based on the predicted target position and the actual target position. Predicting a position of the target in the next frame is based on the process noise covariance matrix Q.

12 Claims, 2 Drawing Sheets

(56) References Cited

U.S. PATENT DOCUMENTS

2010/0312461 A1* 12/2010 Haynie ................ B61L 25/025
                                                                701/117
2017/0276783 A1*  9/2017 McCabe ............... G01S 7/2955

* cited by examiner

ADAPTIVE PROCESS NOISE DESCRIPTION FOR IMPROVED KALMAN FILTER TARGET TRACKING

INTRODUCTION

The subject invention relates to target tracking.

Radar systems are used to detect and track targets from a variety of platforms. Exemplary platforms include vehicles (e.g., automobiles, construction equipment, farm equipment, automated factories), aircraft, and ships. Once a target is detected, a set of algorithms can be used to track that target from one frame to the next. In the case of a moving platform, both the target and the radar system on the platform can be moving. The algorithms generate an estimate of the projected state of the target in the next radar frame based on its kinematic behavior and on measurements. A Kalman filter is generally used for target tracking that considers both a target motion model and measurements to provide an update of target state. The classical Kalman filter is applicable to a linear model, but the space that must be considered when estimating radar return parameters is spherical. Accordingly, it is desirable to provide a target tracking model that accounts for targets that follow a non-linear motion model.

SUMMARY

In one exemplary embodiment, a method of performing target tracking with a radar system that uses a Kalman filter includes predicting a predicted target position of a target detected by the radar system in a frame. The frame is a period of time to transmit from every transmit element of the radar system in turn and receive the reflections from a range of the target. Determining an actual target position of the target detected by the radar system is based on reflections received by the radar system for the frame, and computing a process noise covariance matrix Q for a next frame, immediately following the frame, is based on the predicted target position and the actual target position. A position of the target in the next frame is predicted based on the process noise covariance matrix Q.

In addition to one or more of the features described herein, the computing the process noise covariance matrix Q is as a weighted linear combination of two covariance matrices.

In addition to one or more of the features described herein, the process noise covariance matrix Q is given by:

$$Q = \begin{pmatrix} \Delta_x^2 & 0 & 0 & 0 \\ 0 & \Delta_y^2 & 0 & 0 \\ 0 & 0 & \Delta_{v_x}^2 & 0 \\ 0 & 0 & 0 & \Delta_{v_y}^2 \end{pmatrix}.$$

$\Delta_x$, $\Delta_y$, $\Delta_{vx}$, and $\Delta_{vy}$ are errors in x position, y position, velocity along an x axis, and velocity along a y axis, respectively, between the predicted target position and the actual target position.

In addition to one or more of the features described herein, determining each of $\Delta_x$, $\Delta_y$, $\Delta_{vx}$, and $\Delta_{vy}$ is as a weighted linear combination of a first model that assumes the velocity along the y axis is zero and a second model that assumes the velocity along the x axis is zero.

In addition to one or more of the features described herein, determining a weight of each component of the weighted linear combination is as a predefined value or is based on a comparison of the components associated with the first model and the components associated with the second model.

In another exemplary embodiment, a system to perform target tracking with a Kalman filter includes a radar system to detect a target in a frame. The frame is a period of time to transmit from every transmit element of the radar system in turn and receive the reflections from a range of the target. The system also includes a controller with a processor to predict a predicted target position of the target in the frame, determine an actual position of the target based on the reflections received by the radar system for the frame, compute a process noise covariance matrix Q for a next frame, immediately following the frame, based on the predicted target position and the actual target position, and predict a position of the target in the next frame based on the process noise covariance matrix Q.

In addition to one or more of the features described herein, the controller computes the process noise covariance matrix Q as a weighted linear combination of two covariance matrices.

In addition to one or more of the features described herein, the controller computes the process noise covariance matrix Q as:

$$Q = \begin{pmatrix} \Delta_x^2 & 0 & 0 & 0 \\ 0 & \Delta_y^2 & 0 & 0 \\ 0 & 0 & \Delta_{v_x}^2 & 0 \\ 0 & 0 & 0 & \Delta_{v_y}^2 \end{pmatrix}.$$

$\Delta_x$, $\Delta_y$, $\Delta_{vx}$, and $\Delta_{vy}$ are errors in x position, y position, velocity along an x axis, and velocity along a y axis, respectively, between the predicted target position and the actual target position.

In addition to one or more of the features described herein, the controller determines each of $\Delta_x$, $\Delta_y$, $\Delta_{vx}$, and $\Delta_{vy}$ as a weighted linear combination of a first model that assumes the velocity along the y axis is zero and a second model that assumes the velocity along the x axis is zero.

In addition to one or more of the features described herein, the controller determines a weight of each component of the weighted linear combination as a predefined value or based on a comparison of the components associated with the first model and the components associated with the second model.

In another exemplary embodiment, an automobile includes a radar system to detect a target in a frame. The frame is a period of time to transmit from every transmit element of the radar system in turn and receive the reflections from a range of the target. The system also includes a controller with a processor to predict a predicted target position of the target in the frame, determine an actual position of the target based on the reflections received by the radar system for the frame, compute a process noise covariance matrix Q for a next frame, immediately following the frame, based on the predicted target position and the actual target position, and predict a position of the target in the next frame based on the process noise covariance matrix Q.

In addition to one or more of the features described herein, the controller computes the process noise covariance matrix Q as a weighted linear combination of two covariance matrices.

In addition to one or more of the features described herein, the controller computes the process noise covariance matrix Q as:

$$Q = \begin{pmatrix} \Delta_x^2 & 0 & 0 & 0 \\ 0 & \Delta_y^2 & 0 & 0 \\ 0 & 0 & \Delta_{v_x}^2 & 0 \\ 0 & 0 & 0 & \Delta_{v_y}^2 \end{pmatrix}.$$

$\Delta_x$, $\Delta_y$, $\Delta_{vx}$, and $\Delta_{vy}$ are errors in x position, y position, velocity along an x axis, and velocity along a y axis, respectively, between the predicted target position and the actual target position.

In addition to one or more of the features described herein, the controller determines each of $\Delta_x$, $\Delta_y$, $\Delta_{vx}$, and $\Delta_{vy}$ as a weighted linear combination of a first model that assumes the velocity along the y axis is zero and a second model that assumes the velocity along the x axis is zero.

In addition to one or more of the features described herein, the controller determines a weight of each component of the weighted linear combination as a predefined value or based on a comparison of the components associated with the first model and the components associated with the second model.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawing in which.

DETAILED DESCRIPTION

Figure 1:
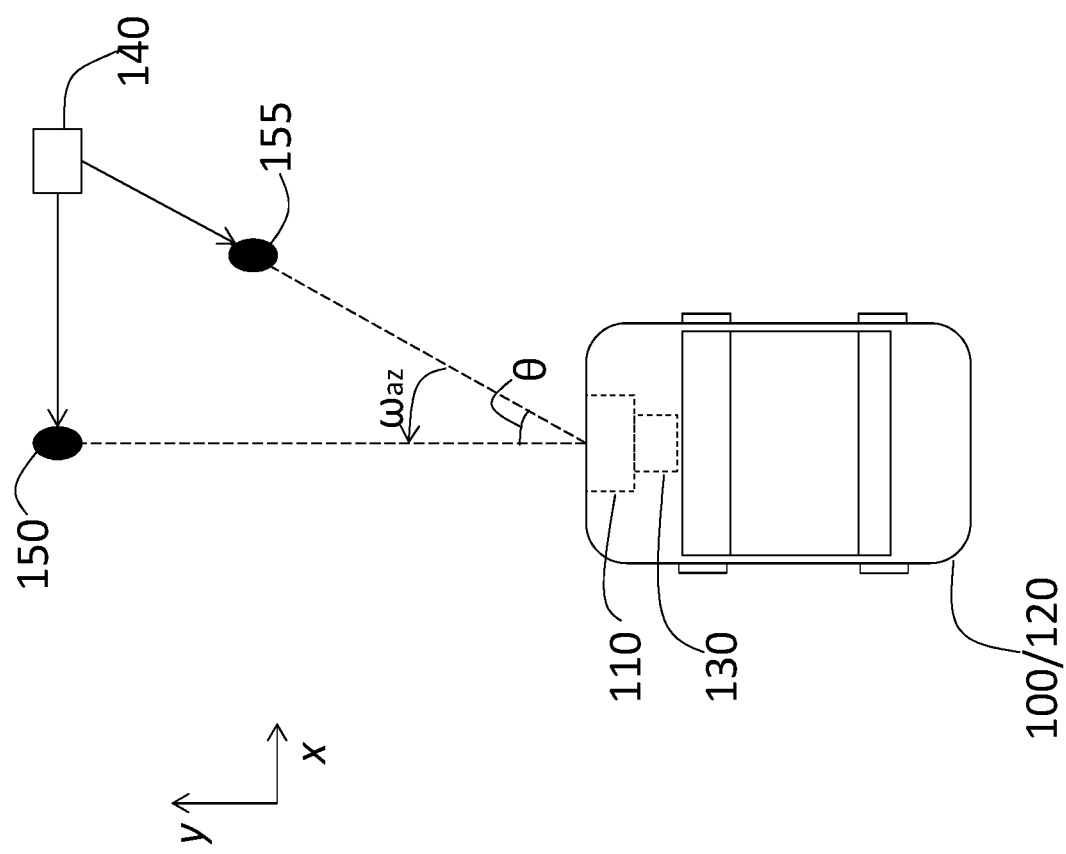
FIG. 1 is a block diagram of a radar system that performs target tracking according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a Kalman filter is generally used to track a target that provides radar reflections from one frame to the next. A frame refers to the time duration to transmit once from every transmit element of the radar system in turn and obtain the reflections from a range of the target being tracked. An exemplary radar system is a multi-input multi-output (MIMO) radar system with multiple transmit elements and multiple receive elements that receive reflections resulting from the transmissions of each of the transmit elements. Other exemplary radar systems include single-input multiple-output (SIMO) with a single transmit element and multiple receive elements, multiple-input single-output (MISO) with multiple transmit elements and a single receive element, and single-input single-output (SISO) with a single transmit element and a single receive element. The transmission can be a linear frequency modulated signal or chirp, for example. The received reflections are processed for each round (frame) of transmission by the transmit elements to track the movement of a target that is detected. When the platform of the radar system is an automobile, for example, tracking the movement of the target can facilitate target avoidance, autonomous driving, and other operations.

A linear Kalman filter provides an accurate target tracking model with low computational complexity relative to other known approaches. As also previously noted, both a target motion model and radar measurements are considered to update the target state. That is, the target tracking is performed as a post-processing technique rather than in real-time. As such, for a given time, both the predicted and actual (measured) results for target position are available and the Kalman filter-based model can be corrected based on the actual results. Generally, a two-dimensional target motion model using the Kalman filter provides a state vector X that is given by:

$$X_k = F_k X_{k-1} + B_k u_k + w_k \qquad [\text{EQ. 1}]$$

The state vector X gives $[x_k, y_k, v_x, v_y]'$ at time k, where $x_k$ and $y_k$ give the two-dimensional position of a target, and $v_x$ and $v_y$ indicate velocity along the x and y axes, respectively. In EQ. 1, $F_k$ is a state transition matrix that is applied to the previous state $X_{k-1}$, $B_k$ is a control-input matrix that is applied to a control vector $u_k$, and $w_k$ is the process noise that is assumed to be drawn from a zero mean multivariate normal distribution with covariance $Q_k$. That is, the process noise $w_k$ is given by:

$$w_k \sim N(0, Q_k) \qquad [\text{EQ. 2}]$$

At time k, an observation or measurement $z_k$ of the true state $X_k$ of the target is made according to:

$$z_k = H_k X_k + v_k \qquad [\text{EQ. 3}]$$

In EQ. 3, $H_k$ is the observation model that maps the true state space into the observed space, and $v_k$ is the observation noise that is assumed to be zero mean Gaussian white noise with covariance $R_k$. That is, observation noise $v_k$ is given by:

$$v_k \sim N(0, R_k) \qquad [\text{EQ. 4}]$$

An area or window around the predicted state $X_k$ of the target is searched for measurements associated with the target during processing of the next frame. When the target is not within the predicted window, the target tracking fails and the prediction track dies out. If the window size is increased to increase the possibility of obtaining target measurements within the window, then the possibility of capturing two targets within the same window and, thus, not being able to track either target, increases. Thus, maintaining a small window within which to search for target measurements is beneficial.

As also noted previously, a limitation of the classical Kalman filter is that it applies to a linear model. When estimating radar return parameters, the space is defined in spherical coordinates (range, azimuth, elevation, Doppler shift) and the motion is described in Cartesian coordinates $(x, y, z, v_x, v_y, v_z)$, where $v_x, v_y, v_z$ are velocities in the x, y, and z dimensions, respectively. Rather than following a linear motion model, the target can move along a radial direction toward or away from the radar, for example. Thus, using the linear Kalman filter, which his applicable to a linear target motion model, on radar parameters can result in a large deviation of target motion from the linear model prediction. This, in turn, can lead to the Kalman filter being ineffective in target tracking.

Embodiments of the systems and methods detailed herein relate to using an adaptive approach to including process noise rather than using a fixed covariance matrix $Q_k$ for the process noise $w_k$. According to embodiments, the error in x, y, $v_x$, $v_y$ according to the predicted state X is proportional to the azimuthal angular speed of the target (the angular speed in elevation is considered to be negligible). Specifically, a weighted linear combination of two covariance matrices is used. These two covariance matrices are developed assuming $v_x$=0 and $v_y$=0, respectively. When the target motion does not match the linear model, less weight is given to the target model because the uncertainty (i.e., process noise) is higher. According to the one or more embodiments detailed herein, the classical Kalman filter can be used with measurements and a dynamic state space model that are represented in different coordinates (e.g., spherical and Cartesian coordinates, respectively) while maintaining window size.

In accordance with an exemplary embodiment of the invention, FIG. 1 is a block diagram of a radar system 110 that performs target tracking using a Kalman filter. The radar system 110 is on a platform 100 that is an automobile 120 according to the exemplary case. As previously noted, other platforms 100 are contemplated for the radar system 110, as well. The radar system 110 can be a multi-input multi-input (MIMO) system with multiple transmit and receive elements. The radar system 110 can transmit a liner frequency modulated (LFM) signal or chirp.

The automobile 120 can have a controller 130 that is coupled to the radar system 110 or otherwise in communication with the radar system 110. The controller 130 can process the received reflections of the radar system 110 to perform target tracking according to one or more embodiments. The target tracking can instead be performed by a processor within the radar system 110. The controller 130 can also perform or communicate with other systems that perform target avoidance, automated driving, and other functions that use information from the radar system 110. The controller 130 can include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A target 140 is shown at a given state. The predicted position 155 according to the Kalman filter is shown along with the actual position 150. The angle θ is formed between the paths to the predicted position 155 and the actual position 150, as shown. The azimuthal angular speed $\omega_{az}$ is also indicated. When the azimuthal angular speed $\omega_{az}$ is zero, then the target motion matches the dynamic linear Kalman filter-based model. This can be thought of as the best case scenario for use of the Kalman filter. When the target 140 moves only in the x direction ($v_y$=0) or only in they direction ($v_x$=0), then there is an error in the state prediction based on the Kalman filter. The most challenging scenario is when a target 140 moves along a tangent trajectory with its Doppler speed (speed toward the radar system 110) always being zero. According to one or more embodiments, the predicted position 155 and actual position 150 for a previous frame (k−1) are used to adaptively determine the process noise covariance matrix $Q_k$ for the next frame rather than using a fixed covariance matrix.

As EQ. 1 indicates, determining the state vector $X_k$ according to EQ. 1 requires determining the process noise $w_k$ according to EQ. 2. According to one or more embodiments, the process noise covariance matrix $Q_k$ that is used to determine the process noise $w_k$ according to EQ. 2 is not fixed but, instead, is given, for each time k, by:

$$Q = \begin{pmatrix} \Delta_x^2 & 0 & 0 & 0 \\ 0 & \Delta_y^2 & 0 & 0 \\ 0 & 0 & \Delta_{v_x}^2 & 0 \\ 0 & 0 & 0 & \Delta_{v_y}^2 \end{pmatrix} \quad [\text{EQ. 5}]$$

The error between the model state projection and the real target position for a given trajectory is used to compute errors in the state variables $\Delta_x$, $\Delta_y$, $\Delta_{v_x}$, and $\Delta_{v_y}$ from one radar frame to the next, with $\Delta_t$ representing the time between frames. As previously noted, the process noise covariance matrix Q according to one or more embodiments is a weighted linear combination of two covariance matrices. Specifically, the two covariance matrices are developed assuming $v_x$=0 (referred to as model 1) and $v_y$=0 (referred to as model 2). Thus, each of $\Delta_x$, $\Delta_y$, $\Delta_{v_x}$, and $\Delta_{v_y}$ is:

$$\Delta_x = w_{1x}[\Delta_x]_{mod\ el1} + w_{2x}[\Delta_x]_{mod\ el2} \quad [\text{EQ. 6}]$$

$$\Delta_y = w_{1y}[\Delta_y]_{mod\ el1} + w_{2y}[\Delta_y]_{mod\ el2} \quad [\text{EQ. 7}]$$

$$\Delta_{v_x} = w_{1v_x}[\Delta_{v_x}]_{mod\ el1} + w_{2v_x}[\Delta_{v_x}]_{mod\ el2} \quad [\text{EQ. 8}]$$

$$\Delta_{v_y} = w_{1v_y}[\Delta_{v_y}]_{mod\ el1} + w_{2v_y}[\Delta_{v_y}]_{mod\ el2} \quad [\text{EQ. 9}]$$

In EQ. 6 through EQ. 9, each w is the weight corresponding to the respective component. The value of each w can be predefined or may be determined based on a comparison of the values resulting from each model. For example, $w_{1x}$ and $w_{2x}$ may be determined based on a ratio, difference, or other comparison of $\Delta_x$ determined by model 1 and $\Delta_x$ determined by model 2. In alternate embodiments, a look-up table may be used, and the weights may be determined based on a range within which the corresponding component value falls. For example, the value of $\Delta_{v_y}$ determined with model 1 may match up with a particular value of $w_{1v_y}$ in the look-up table.

Each of $\Delta_x$, $\Delta_y$, $\Delta_{v_x}$, and $\Delta_{v_y}$ for model 1, which assumes $v_y$=0, is given by:

$$\Delta_{v_x} = v_x - (v_x \cos \theta)\cos \theta = v_x \sin^2\theta \approx \omega_{az} R \sin^2\theta \quad [\text{EQ. 10}]$$

$$\Delta_{v_y} = 0 - (v_x \cos \theta)\sin \theta = -v_x \cos \theta \sin \theta \approx \omega_{az} R \cos \theta \sin \theta \quad [\text{EQ. 11}]$$

$$\Delta_x = \Delta_{v_x} \Delta_t \approx \omega_{az} R \Delta_t \sin^2\theta \quad [\text{EQ. 12}]$$

$$\Delta_y = \Delta_{v_y} \Delta_t \approx \omega_{az} R \cos \theta \sin \theta \quad [\text{EQ. 13}]$$

Each of $\Delta_x$, $\Delta_y$, $\Delta_{v_x}$, and $\Delta_{v_y}$ for model 2, which assumes $v_x$=0, is given by:

$$\Delta_{v_x} = 0 - (v_x \sin \theta)\cos \theta = -v_y \cos \theta \sin \theta \approx -\omega_{az} R \cos \theta \sin \theta \quad [\text{EQ. 14}]$$

$$\Delta_{v_y} = v_y - (v_y \sin \theta)\sin \theta = -v_y \cos^2\theta \approx \omega_{az} R \cos^2\theta \quad [\text{EQ. 15}]$$

$$\Delta_x = \Delta_{v_x} \Delta_t \approx -\omega_{az} R \Delta_t \cos \theta \sin \theta \quad [\text{EQ. 16}]$$

$$\Delta_y = \Delta_{v_y} \Delta_t \approx \omega_{az} R \Delta_t \cos^2\theta \quad [\text{EQ. 17}]$$

Figure 2:
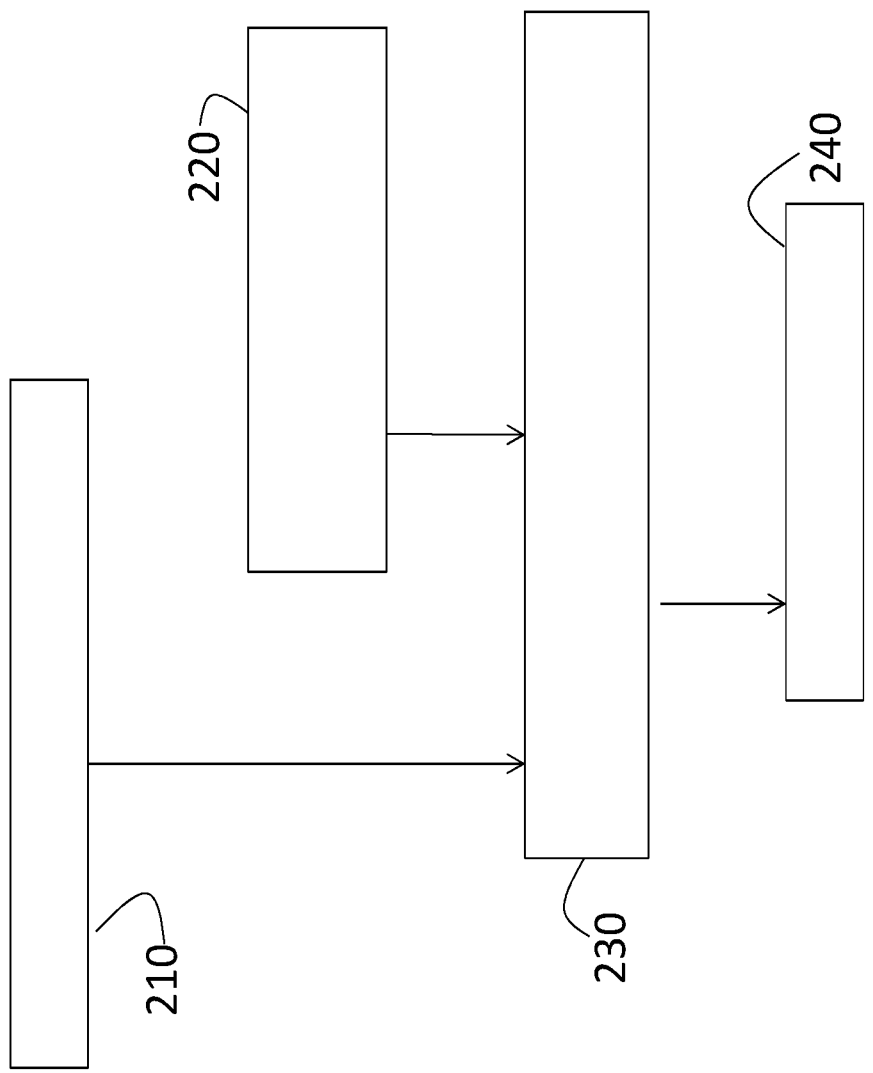
FIG. 2 is a process flow of a method of performing target tracking according to one or more embodiments.

FIG. 2 is a process flow of a method of performing target tracking with a radar system 110 that uses a Kalman filter according to one or more embodiments. At block 210, predicting target position for a frame k involves obtaining the state vector $X_k$ according to EQ. 1. When the frame is the first frame, the process noise can be determined using a fixed process noise covariance matrix $Q_k$. At block 220, determining target position based on radar measurements for the same frame refers to receiving and processing reflections resulting from transmissions during the frame duration. Computing the process noise covariance matrix $Q_{k+1}$, at block 230, is based on EQ. 5 through EQ. 17. Once the process noise covariance matrix $Q_{k+1}$ is computed (at block 230), EQ. 1 is used, at block 240, to obtain the state vector $X_{k+1}$ and, thereby, the position and velocity in the x and y axis. Thus, at block 240, predicting target position is facilitated.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the description not be limited to the particular embodiments disclosed, but will include all embodiments falling within the scope of the application.

What is claimed is:

1. A method of performing target tracking with a radar system that uses a Kalman filter, the method comprising:
   predicting a predicted target position of a target detected by the radar system in a frame, wherein the frame is a period of time to transmit from every transmit element of the radar system in turn and receive the reflections from a range of the target;
   determining an actual target position of the target detected by the radar system based on reflections received by the radar system for the frame;
   computing a process noise covariance matrix Q for a next frame, immediately following the frame, based on the predicted target position and the actual target position; and
   predicting a position of the target in the next frame based on the process noise covariance matrix Q, wherein the process noise covariance matrix Q is given by:

$$Q = \begin{pmatrix} \Delta_x^2 & 0 & 0 & 0 \\ 0 & \Delta_y^2 & 0 & 0 \\ 0 & 0 & \Delta_{v_x}^2 & 0 \\ 0 & 0 & 0 & \Delta_{v_y}^2 \end{pmatrix},$$

where $\Delta_x$, $\Delta_y$, $\Delta_{vx}$, and $\Delta_{vy}$ are errors in x position, y position, velocity along an x axis, and velocity along a y axis, respectively, between the predicted target position and the actual target position.

2. The method according to claim 1, wherein the computing the process noise covariance matrix Q is as a weighted linear combination of two covariance matrices.

3. The method according to claim 1, further comprising determining each of $\Delta_x$, $\Delta_y$, $\Delta_{vx}$, and $\Delta_{vy}$ as a weighted linear combination of a first model that assumes the velocity along the y axis is zero and a second model that assumes the velocity along the x axis is zero.

4. The method according to claim 3, further comprising determining a weight of each component of the weighted linear combination as a predefined value or based on a comparison of the components associated with the first model and the components associated with the second model.

5. A system to perform target tracking with a Kalman filter, the system comprising:
   a radar system configured to detect a target in a frame, wherein the frame is a period of time to transmit from every transmit element of the radar system in turn and receive the reflections from a range of the target; and
   a controller comprising a processor, the controller configured to predict a predicted target position of the target in the frame, determine an actual position of the target based on the reflections received by the radar system for the frame, compute a process noise covariance matrix Q for a next frame, immediately following the frame, based on the predicted target position and the actual target position, and predict a position of the target in the next frame based on the process noise covariance matrix Q, wherein the controller computes the process noise covariance matrix Q as:

$$Q = \begin{pmatrix} \Delta_x^2 & 0 & 0 & 0 \\ 0 & \Delta_y^2 & 0 & 0 \\ 0 & 0 & \Delta_{v_x}^2 & 0 \\ 0 & 0 & 0 & \Delta_{v_y}^2 \end{pmatrix},$$

where $\Delta_x$, $\Delta_y$, $\Delta_{vx}$, and $\Delta_{vy}$ are errors in x position, y position, velocity along an x axis, and velocity along a v axis, respectively, between the predicted target position and the actual target position.

6. The system according to claim 5, wherein the controller computes the process noise covariance matrix Q as a weighted linear combination of two covariance matrices.

7. The system according to claim 5, wherein the controller determines each of $\Delta_x$, $\Delta_y$, $\Delta_{vx}$, and $\Delta_{vy}$ as a weighted linear combination of a first model that assumes the velocity along the y axis is zero and a second model that assumes the velocity along the x axis is zero.

8. The system according to claim 7, wherein the controller determines a weight of each component of the weighted linear combination as a predefined value or based on a comparison of the components associated with the first model and the components associated with the second model.

9. An automobile, comprising:
   a radar system configured to detect a target in a frame, wherein the frame is a period of time to transmit from every transmit element of the radar system in turn and receive the reflections from a range of the target; and
   a controller comprising a processor, the controller configured to predict a predicted target position of the target in the frame, determine an actual position of the target based on the reflections received by the radar system for the frame, compute a process noise covariance matrix Q for a next frame, immediately following the frame, based on the predicted target position and the actual target position, and predict a position of the target in the next frame based on the process noise covariance matrix Q, wherein the controller computes the process noise covariance matrix Q as:

$$Q = \begin{pmatrix} \Delta_x^2 & 0 & 0 & 0 \\ 0 & \Delta_y^2 & 0 & 0 \\ 0 & 0 & \Delta_{v_x}^2 & 0 \\ 0 & 0 & 0 & \Delta_{v_y}^2 \end{pmatrix},$$

where $\Delta_x$, $\Delta_y$, $\Delta_{vx}$, and $\Delta_{vy}$ are errors in x position, y position, velocity along an x axis, and velocity along a y axis, respectively, between the predicted target position and the actual target position.

10. The automobile according to claim 9, wherein the controller computes the process noise covariance matrix Q as a weighted linear combination of two covariance matrices.

11. The automobile according to claim 9, wherein the controller determines each of $\Delta_x$, $\Delta_y$, $\Delta_{vx}$, and $\Delta_{vy}$ as a weighted linear combination of a first model that assumes the velocity along the y axis is zero and a second model that assumes the velocity along the x axis is zero.

12. The automobile according to claim 11, wherein the controller determines a weight of each component of the weighted linear combination as a predefined value or based on a comparison of the components associated with the first model and the components associated with the second model.

* * * * *